(12) United States Patent
Matsumura et al.

(10) Patent No.: US 12,267,694 B2
(45) Date of Patent: Apr. 1, 2025

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 370 days.

(21) Appl. No.: 17/776,851

(22) PCT Filed: Nov. 15, 2019

(86) PCT No.: PCT/JP2019/044968
§ 371 (c)(1),
(2) Date: May 13, 2022

(87) PCT Pub. No.: WO2021/095265
PCT Pub. Date: May 20, 2021

(65) Prior Publication Data
US 2022/0394501 A1    Dec. 8, 2022

(51) Int. Cl.
*H04W 16/28*    (2009.01)
*H04W 72/044*    (2023.01)
*H04W 72/0446*    (2023.01)

(52) U.S. Cl.
CPC ........ *H04W 16/28* (2013.01); *H04W 72/0446* (2013.01); *H04W 72/046* (2013.01)

(58) Field of Classification Search
CPC .............................. H04W 16/28; H04W 72/046
See application file for complete search history.

(56) References Cited

U.S. PATENT DOCUMENTS

| | | | |
|---|---|---|---|
| 2020/0220703 A1* | 7/2020 | Kim | H04L 27/26 |
| 2020/0245333 A1* | 7/2020 | Lin | H04L 1/0026 |
| 2021/0136802 A1* | 5/2021 | Cirik | H04B 7/0695 |
| 2022/0078772 A1* | 3/2022 | Chen | H04L 1/1812 |
| 2022/0104208 A1* | 3/2022 | Chen | H04W 72/56 |
| 2022/0116177 A1* | 4/2022 | Shi | H04L 5/0055 |
| 2022/0264537 A1* | 8/2022 | Shi | H04L 5/001 |
| 2023/0199793 A1* | 6/2023 | Muruganathan | H04L 5/0053 370/329 |

OTHER PUBLICATIONS

Office Action issued in Indonesia Application No. P00202205923, dated Jul. 22, 2024 (7 pages).

(Continued)

*Primary Examiner* — Zhiren Qin
(74) *Attorney, Agent, or Firm* — Osha Bergman Watanabe & Burton LLP

(57) ABSTRACT

A terminal according to one aspect of the present disclosure includes a receiving section that receives a plurality of pieces of configuration information indicating a plurality of control resource sets, and a control section that, when the plurality of pieces of configuration information do not include a control resource set pool index for one or more control resource sets of the plurality of control resource sets, determines a value of the control resource set pool index for the one or more control resource sets. According to one aspect of the present disclosure, it is possible to appropriately determine an operation for multiple panels/TRPs.

5 Claims, 9 Drawing Sheets

| CORESET INDEX | CORESET POOL INDEX |
|---|---|
| 1 | 0 |
| 2 | 1 |
| 3 | NONE |

(56) References Cited

OTHER PUBLICATIONS

3GPP TSG-RAN WG1 Meeting #99; R1-1913202; Samsung; "Introduction of MIMO enhancements"; Reno, USA, Nov. 18-22, 2019 (39 pages).
3GPP TSG RAN WG1 #99; R1-1912893; NTT DOCOMO, Inc; "Enhancements on multi-TRP/panel transmission"; Reno, USA, Nov. 18-22, 2019 (21 pages).
International Search Report issued in PCT/JP2019/044968 on Jul. 7, 2020 (2 pages).
Written Opinion of the International Searching Authority issued in PCT/JP2019/044968 on Jul. 7, 2020 (4 pages).
OPPO; "Enhancements on multi-TRP and multi-panel transmission"; 3GPP TSG RAN WG1 Meeting #99, R1-1911843; Reno, USA; Nov. 18-22, 2019 (12 pages).
Qualcomm Incorporated; "Multi-TRP Enhancements"; 3GPP TSG-RAN WG1 Meeting #99, R1-1912967; Reno, Nevada, USA; Nov. 18-22, 2019 (23 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

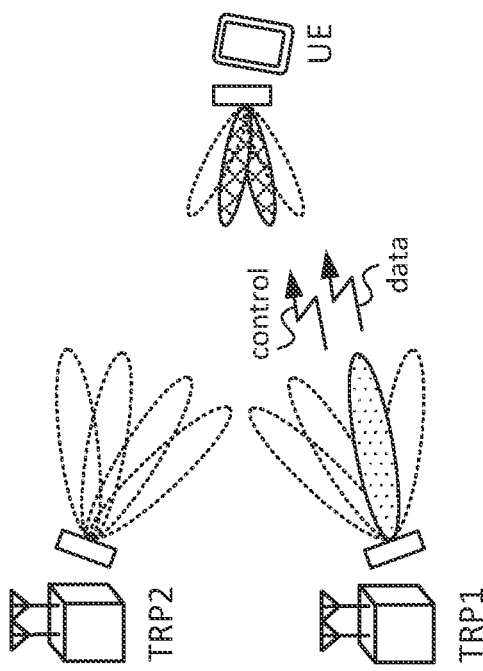
FIG. 2A SINGLE MODE
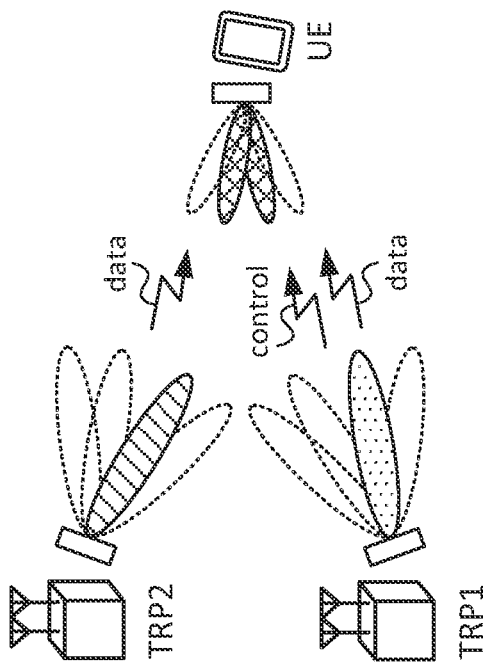
FIG. 2B SINGLE MASTER MODE
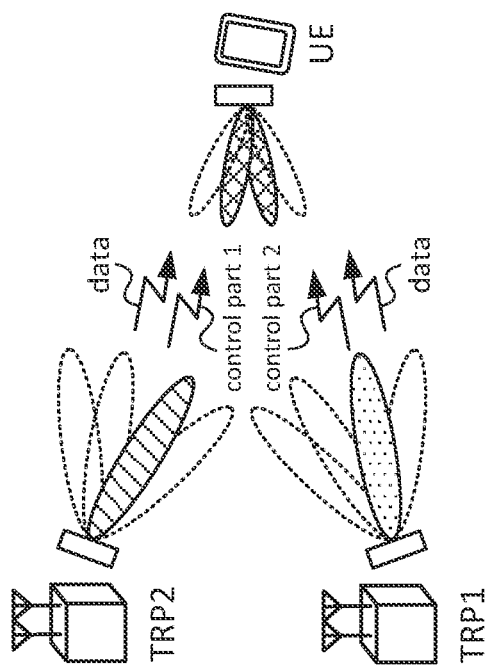
FIG. 2C MASTER SLAVE MODE
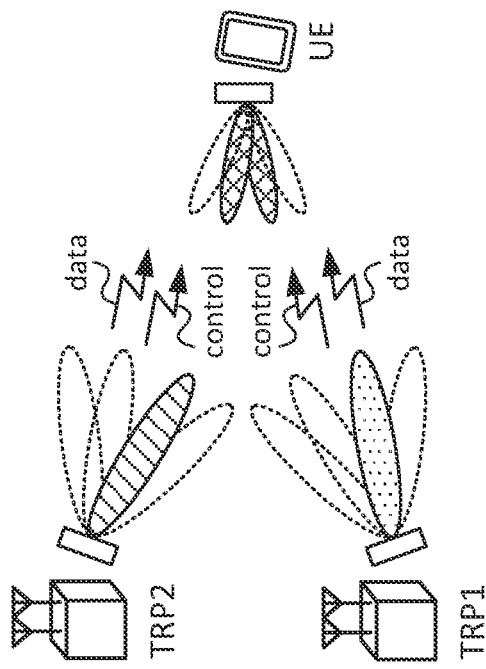
FIG. 2D MULTI-MASTER MODE

| CORESET INDEX | CORESET POOL INDEX |
|---|---|
| 1 | NONE |
| 2 | NONE |
| 3 | NONE |

FIG. 3

| CORESET INDEX | CORESET POOL INDEX |
|---|---|
| 1 | 0 |
| 2 | 1 |
| 3 | NONE |

FIG. 4

| CORESET INDEX | CORESET POOL INDEX |
|---|---|
| 1 | 0 |
| 2 | 0 |
| 3 | NONE |

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (e.g., NR), a user terminal (User Equipment (UE)) that controls a transmitting/receiving processing on the basis of information related to quasi-co-location (QCL) is under study.

For NR, one or a plurality of transmission/reception points (TRPs) (multiple TRPs) that perform DL transmission (e.g., PDSCH transmission) to the UE by using one or a plurality of panels (multiple panels) and the UE that performs UL transmission to the multiple TRPs or multiple panels are also under study.

However, in NR specifications thus far, multiple panels/TRPs are not considered, and thus unless whether the multiple panels/TRPs are used can be appropriately determined, system performance degradation, such as throughput reduction, may occur.

Thus, an object of the present disclosure is to provide a terminal and a radio communication method that appropriately determine an operation for multiple panels/TRPs.

Solution to Problem

A terminal according to one aspect of the present disclosure includes a receiving section that receives a plurality of pieces of configuration information indicating a plurality of control resource sets, and a control section that, when the plurality of pieces of configuration information do not include a control resource set pool index for one or more control resource sets of the plurality of control resource sets, determines a value of the control resource set pool index for the one or more control resource sets.

Advantageous Effects of Invention

According to one aspect of the present disclosure, it is possible to appropriately determine an operation for multiple panels/TRPs.

BRIEF DESCRIPTION OF DRAWINGS

FIGS. 2A to 2D are diagrams to show examples of a multi-TRP scenario;

FIG. 3 is a diagram to show an example of CORESET pool indices configured for CORESETs in Embodiment 1;

FIG. 4 is a diagram to show an example of CORESET pool indices configured for CORESETs in case 1 of Embodiment 2-1;

FIG. 5 is a diagram to show an example of CORESET pool indices configured for CORESETs in case 2 of Embodiment 2-1;

DESCRIPTION OF EMBODIMENTS (TCI, QCL)

Figure 1:
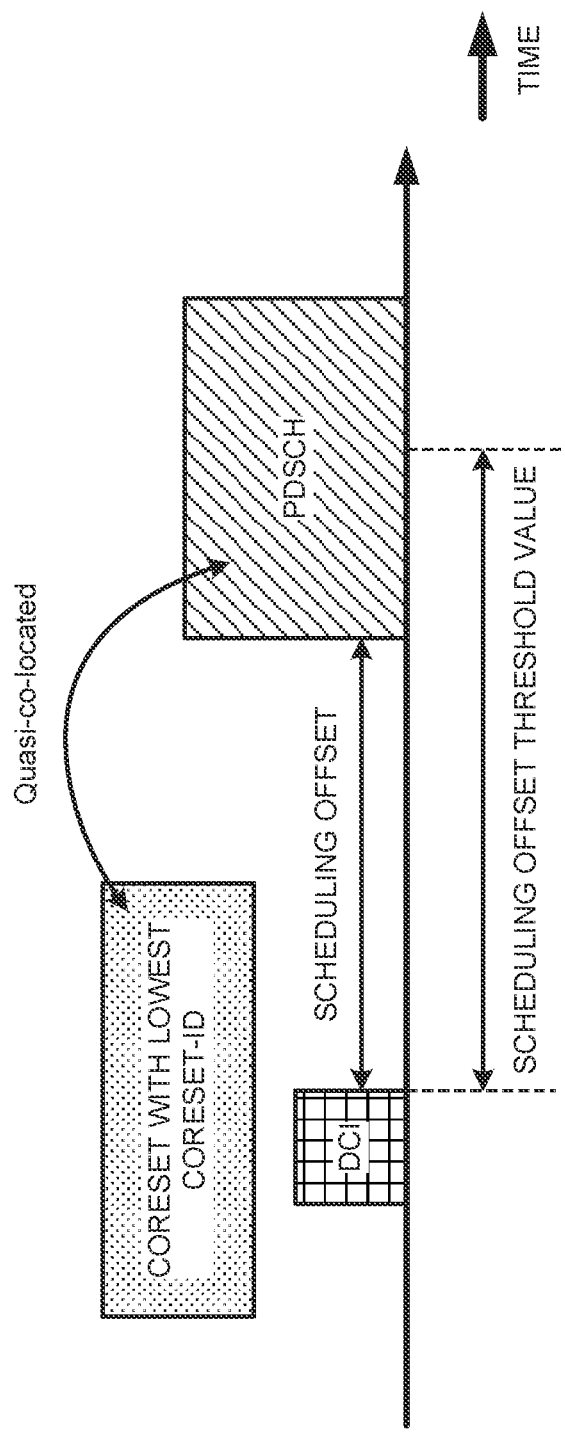
FIG. 1 is a diagram to show an example of a QCL assumption for a DMRS port for a PDSCH.

For NR, controlling a reception process (e.g., at least one of reception, demapping, demodulation, and decoding) and a transmission processing (e.g., at least one of transmission, mapping, precoding, modulation, and coding) for at least one of a signal and a channel (represented as a signal/channel) in the UE on the basis of a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, and so on. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread,
QCL type B (QCL-B): Doppler shift and Doppler spread,
QCL type C (QCL-C): Doppler shift and Average delay, and
QCL type D (QCL-D): Spatial reception parameter.

A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (e.g., another RS). The TCI state may be configured (indicated) by higher layer signaling or physical layer signaling, or a combination of these.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS having a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The UE may receive configuration information including a list of information elements of the TCI state (e.g., PDSCH-Config or tci-StatesToAddModList) by using higher layer signaling.

An information element of the TCI state ("TCI-state IE" of RRC) configured by higher layer signaling may include a TCI state ID and one or a plurality of pieces of QCL information ("QCL-Info"). The QCL information may include at least one of information related to the RS being a QCL relationship (RS relation information) and information indicating a QCL type (QCL type information). The RS relation information may include information about an RS index (e.g., an SSB index or a non-zero power CSI-RS (Non-Zero-Power (NZP) CSI-RS) resource ID (Identifier)), an index for a cell in which the RS is located, an index for a Bandwidth Part (BWP) in which the RS is located, or the like.

In Rel. 15 NR, as the TCI state for at least one of the PDCCH and PDSCH, both of an RS of QCL type A and an RS of QCL type D or only the RS of QCL type A can be configured for the UE.

When the TRS is configured as the RS of QCL type A, it is assumed that the TRS is different from a demodulation reference signal (DMRS) for the PDCCH or PDSCH and the same TRS is periodically transmitted for a long time. The UE can calculate average delay, delay spread, and the like by measuring the TRS.

The UE for which the TRS as the RS of QCL type A has been configured with respect to a TCI state for the DMRS for the PDCCH or PDSCH can assume that the DMRS for the PDCCH or PDSCH and parameters of QCL type A (average delay, delay spread, and the like) for the TRS are the same, and thus can obtain parameters of QCL type A (average delay, delay spread, and the like) for the DMRS for the PDCCH or PDSCH on the basis of a measurement result of the TRS. When performing a channel estimation of at least one of the PDCCH and PDSCH, the UE can perform the channel estimation with higher accuracy by using the measurement result of the TRS.

The UE for which the RS of QCL type D has been configured can determine a UE receive beam (spatial domain reception filter or UE spatial domain reception filter) by using the RS of QCL type D.

An RS of QCL type X in a TCI state may mean an RS being in a QCL type X relationship with a certain channel/signal (for the DMRS), and this RS may be referred to as a QCL source of QCL type X in the TCI state.

<TCI State for PDCCH>

Information related to QCL between a PDCCH (or a DMRS antenna port related to the PDCCH) and a certain RS may be referred to as a TCI state for the PDCCH and so on.

The UE may judge a TCI state for a UE-specific PDCCH (CORESET) on the basis of higher layer signaling. For example, one or a plurality (K pieces) of TCI states may be configured for the UE by RRC signaling for each CORESET.

One of the plurality of TCI states configured by the RRC signaling may be activated by a MAC CE for the UE, for each CORESET. The MAC CE may be referred to as a TCI state indication MAC CE for a UE-specific PDCCH (TCI State Indication for UE-specific PDCCH MAC CE). The UE may perform monitoring of a CORESET on the basis of an active TCI state corresponding to the CORESET.

<TCI State for PDSCH>

Information related to QCL between a PDSCH (or a DMRS antenna port related to the PDSCH) and a certain DL-RS may be referred to as a TCI state for the PDSCH and so on.

M (M≥1) pieces of TCI states for the PDSCH (M pieces of QCL information for the PDSCH) may be notified to (configured for) the UE by higher layer signaling. Note that the number of the TCI states M configured for the UE may be limited by at least one of a UE capability and a QCL type.

DCI used for scheduling of the PDSCH may include a certain field (which may be referred to as, for example, a TCI field, a TCI state field, and so on) indicating a TCI state for the PDSCH. The DCI may be used for scheduling of a PDSCH in one cell, and may be referred to as, for example, DL DCI, DL assignment, DCI format 1_0, DCI format 1_1, and so on.

Whether the TCI field is included in the DCI may be controlled by information notified from a base station to the UE. The information may be information (e.g., TCI presence information, TCI presence in DCI information, or a higher layer parameter TCI-PresentInDCI) indicating whether the TCI field is present or absent in the DCI. For example, the information may be configured for the UE by higher layer signaling.

When more than 8 kinds of TCI states are configured for the UE, 8 or less kinds of TCI states may be activated (or designated) with use of a MAC CE. The MAC CE may be referred to as a TCI state activation/deactivation MAC CE for a UE-specific PDSCH (TCI States Activation/Deactivation for UE-specific PDSCH MAC CE). A value of the TCI field in the DCI may indicate one of the TCI states activated by the MAC CE.

When the TCI presence information set to "enabled" relative to a CORESET to schedule the PDSCH (CORESET used for PDCCH transmission to schedule the PDSCH) is configured for the UE, the UE may assume that the TCI field exists in DCI format 1_1 for a PDCCH transmitted on the CORESET.

In a case where the TCI presence information is not configured to a CORESET to schedule a PDSCH or the PDSCH is scheduled by DCI format 1_0, when time offset between reception of DL DCI (DCI to schedule the PDSCH) and reception of a PDSCH corresponding to the DCI is equal to or greater than a threshold value, the UE may assume that a TCI state or QCL assumption for the PDSCH is, for determination of QCL of a PDSCH antenna port, identical to a TCI state or QCL assumption applied to a CORESET used for PDCCH transmission to schedule the PDSCH.

In a case where the TCI presence information is set to "enabled," when a TCI field in DCI in a component carrier (CC) to schedule (a PDSCH) indicates an activated TCI state in a CC or DL BWP to be scheduled and the PDSCH is scheduled by DCI format 1_1, the UE may use, for determination of QCL of the PDSCH antenna port, a TCI depending on a TCI field value in a detected PDCCH including the DCI. When time offset between reception of DL DCI (to schedule the PDSCH) and a PDSCH corresponding to the DCI (PDSCH scheduled by the DCI) is equal to or greater than a threshold value, the UE may assume that a DM-RS port for a PDSCH of a serving cell is QCL with an RS in a TCI state related to a QCL type parameter given by an indicated TCI state.

When a single-slot PDSCH is configured for the UE, the indicated TCI state may be based on an activated TCI state in a slot with the scheduled PDSCH. When a multi-slot PDSCH is configured for the UE, the indicated TCI state may be based on an activated TCI state in the first slot with the scheduled PDSCH, and the UE may expect that the indicated TCI state is identical through slots with the scheduled PDSCH. In a case where a CORESET associated with a search space set for cross-carrier scheduling is configured for the UE, TCI presence information is set to "enabled" to the CORESET for the UE, when at least one of TCI states configured for a serving cell scheduled by the search space set includes QCL type D, the UE may assume that time offset between a detected PDCCH and a PDSCH corresponding to the PDCCH is equal to or greater than a threshold value.

In both of a case where TCI information in DCI (higher layer parameter TCI-PresentInDCI) is set to "enabled" in an RRC connected mode and a case where the TCI information in the DCI is not configured in the RRC connected mode, when time offset between reception of DL DCI (DCI to schedule a PDSCH) and a corresponding PDSCH (PDSCH scheduled by the DCI) is less than a threshold value, the UE may assume that the DM-RS port for the PDSCH in the serving cell includes the lowest (minimum) CORESET-ID in the latest (most recent) slot in which one or more CORESETs in an active BWP for the serving cell are monitored by the UE, and may assume that the DM-RS port is QCL with an RS related to a QCL parameter used for QCL indication of a PDCCH for a CORESET associated with a monitored search space (FIG. 1). This RS may be referred to as a default TCI state for the PDSCH or a default QCL assumption for the PDSCH.

The time offset between reception of DL DCI and reception of a PDSCH corresponding to the DCI may be referred to as scheduling offset.

The above-described threshold value may be referred to as a time length for QCL (time duration), "timeDurationForQCL," "Threshold," "Threshold for offset between a DCI indicating a TCI state and a PDSCH scheduled by the DCI," "Threshold-Sched-Offset," a schedule offset threshold value, a scheduling offset threshold value, and so on.

The time length for QCL may be based on a UE capability, and may be based on, for example, a delay in PDCCH decoding and beam switching. The time length for QCL may be a minimum time required for the UE to perform PDCCH reception and application of spatial QCL information received in DCI for PDSCH processing. The time length for QCL may be represented by the number of symbols for each piece of subcarrier spacing, or may be represented by time (e.g., μs). Information about the time length for QCL may be reported as UE capability information from the UE to the base station, or may be configured for the UE by higher layer signaling from the base station.

For example, the UE may assume that a DMRS port for the above-described PDSCH is QCL with a DL-RS based on a TCI state activated with respect to a CORESET corresponding to the above-described lowest CORESET-ID. The latest slot may be, for example, a slot for receiving DCI to schedule the above-described PDSCH.

Note that the CORESET-ID may be an ID (ID for CORESET identification or controlResourceSetId) configured by an RRC information element "ControlResourceSet."

When CORESETs are not configured for a CC, the default TCI state may be an activated TCI state capable of being applied to a PDSCH in an active DL BWP for the CC, the activated TCI state having the lowest ID.

In Rel. 16 (or later versions), in a case where each of a PDSCH and a PDCCH to schedule the PDSCH exists in a different component carrier (CC) (cross-carrier scheduling), when a PDCCH-to-PDSCH delay is shorter than the time length for QCL or when a TCI state is absent in DCI for the scheduling, the UE may obtain a QCL assumption for the scheduled PDSCH based on an active TCI state having the lowest ID and capable of being applied to a PDSCH in an active BWP for the scheduled cell.

(RLM)

In NR, radio link monitoring (RLM) is used.

In NR, the base station may configure, for the UE, a radio link monitoring reference signal (Radio Link Monitoring RS (RLM-RS)) by using higher layer signaling for each BWP. The UE may receive configuration information for RLM (e.g., "RadioLinkMonitoringConfig" information element of RRC).

The configuration information for RLM may include resource configuration information for failure detection (e.g., a higher layer parameter "failureDetectionResources-ToAddModList"). The resource configuration information for failure detection may include a parameter related to the RLM-RS (e.g., a higher layer parameter "RadioLinkMonitoringRS").

The parameter related to the RLM-RS may include information indicating a corresponding purpose of RLM, an index corresponding to resources for the RLM-RS (e.g., an index included in a higher layer parameter "failureDetectionResources"), or the like. For example, the index may be an index for CSI-RS resource configuration (e.g., a non-zero power CSI-RS resource ID), or may be an SS/PBCH block index (SSB index).

The UE may identify an RLM-RS resource on the basis of the index corresponding to the resources for the RLM-RS to perform RLM by using the RLM-RS resource.

When RadioLinkMonitoringRS (RLM-RS) is not provided for the UE and a TCI state including one or more CSI-RSs for PDCCH reception is provided for the UE:

When an active TCI state for the PDCCH reception includes only one RS, the UE may use, for RLM, an RS provided to a TCI state for the active TCI state for the PDCCH reception.

When the active TCI state for the PDCCH reception includes two RSs, the UE expects that one RS has QCL type D, the UE uses the RS having QCL type D for RLM, and the UE does not expect that both of the RSs have QCL type D.

The UE may not be required to use an aperiodic or semi-persistent RS for RLM.

For $L_{max}$ (maximum number of SS/PBCH block candidates for each half-frame)=4, the UE may select, in sequence starting from the shortest monitoring period for a search space, $N_{RLM}$ pieces of RSs provided for an active TCI state for PDCCH reception in a CORESET associated with the search space. When more than one CORESET is associated with a search space set having the same monitoring period, the UE may determine a CORESET sequence starting from the highest CORESET index (ID). The UE may select $N_{RLM}$ pieces of RSs in accordance with this CORESET sequence.

When RadioLinkMonitoringRS is not provided for the UE, the UE may not expect that more than $N_{RLM}$ pieces of RadioLinkMonitoringRSs are used for RLM.

When $L_{max}$=4, $N_{RLM}$ may be equal to 2. When $L_{max}$=8, $N_{RLM}$ may be equal to 4. When $L_{max}$=64, $N_{RLM}$ may be equal to 8.

When information about a reference signal (RS) for RLM (e.g., RadiolinkMonitoringRS) is not provided for the UE, the UE determines the RLM-RS on the basis of a TCI state for a PDCCH. The number of RLM-RSs should be equal to or less than $N_{RLM}$.

(Multiple TRPs)

For NR, one or a plurality of transmission/reception points (TRPs) (multiple TRPs) that perform DL transmission to the UE by using one or a plurality of panels (multiple panels) are under study. The UE that performs UL transmission to the one or a plurality of TRPs is also under study.

Note that the plurality of TRPs may correspond to the same cell identifier (ID), or may correspond to different cell IDs. The cell ID may be a physical cell ID, or may be a virtual cell ID.

FIGS. 2A to 2D are diagrams to show examples of a multi-TRP scenario. In these examples, it is assumed that each TRP can transmit four different beams, but the present disclosure is not limited to this.

FIG. 2A shows an example of a case where only one TRP (TRP 1 in the present example) of multiple TRPs performs transmission to the UE (which may be referred to as a single mode, a single TRP, and so on). In this case, TRP 1 transmits both a control signal (PDCCH) and a data signal (PDSCH) to the UE.

FIG. 2B shows an example of a case where only one TRP (TRP 1 in the present example) of multiple TRPs transmits a control signal to the UE and the multiple TRPs transmit a data signal (which may be referred to as a single master mode). The UE receives, on the basis of one piece of downlink control information (DCI), respective PDSCHs transmitted from the multiple TRPs.

FIG. 2C shows an example of a case where each of multiple TRPs transmits part of a control signal to the UE and the multiple TRPs transmit a data signal (which may be referred to as a master slave mode). Part 1 of the control signal (DCI) may be transmitted from TRP 1, and part 2 of the control signal (DCI) may be transmitted from TRP 2. Part 2 of the control signal may depend on part 1. The UE receives, on the basis of these parts of the DCI, each PDSCH transmitted from the multiple TRPs.

FIG. 2D shows an example of a case where each of multiple TRPs transmits a separate control signal to the UE and the multiple TRPs transmit a data signal (which may be referred to as a multi-master mode). A first control signal (DCI) may be transmitted from TRP 1, and a second control signal (DCI) may be transmitted from TRP 2. The UE receives, on the basis of these pieces of DCI, respective PDSCHs transmitted from the multiple TRPs.

When a plurality of PDSCHs (which may be referred to as multiple PDSCHs) from multiple TRPs, such as shown in FIG. 2B, are scheduled with use of one piece of DCI, the DCI may be referred to as single DCI (single PDCCH). When a plurality of PDSCHs from multiple TRPs, such as shown in FIG. 2D, are scheduled with use of a plurality of pieces of DCI, these pieces of DCI may be referred to as multiple DCI (multiple PDCCHs).

Different codewords (Code Words (CWs)) and different layers may be transmitted from each TRP of the multiple TRPs. For a mode of multi-TRP transmission, non-coherent joint transmission (NCJT) is under study.

In the NCJT, for example, TRP 1 performs modulation mapping and layer mapping for a first codeword to transmit a first PDSCH by using first precoding for a first number of layers (e.g., 2 layers). TRP 2 performs modulation mapping and layer mapping for a second codeword to transmit a second PDSCH by using second precoding for a second number of layers (e.g., 2 layers).

Note that a plurality of PDSCHs (multiple PDSCHs) for which the NCJT is performed may be defined as partially or fully overlapping with respect to at least one of time and frequency domains. In other words, a first PDSCH from a first TRP and a second PDSCH from a second TRP may overlap with each other in at least one of time and frequency resources.

It may be assumed that these first PDSCH and second PDSCH are not in a quasi-co-location (QCL) relation (not quasi-co-located). Reception of the multiple PDSCHs may be interpreted as simultaneous reception of PDSCHs not being a certain QCL type (e.g., QCL type D).

For traffic types (services), such as highly reliable and low-latency communications (e.g., Ultra-reliable and Low-Latency Communications (URLLC)) for multiple TRPs and the like, supported repetition of PDSCHs (transport blocks (TBs) or codewords (CWs)) across the multiple TRPs is under study. Supported repetition schemes (URLLC schemes, for example, schemes 1, 2a, 2b, 3, and 4) across the multiple TRPs on a frequency domain, layer (spatial) domain, or time domain are under study. Scheme 1 applies space division multiplexing (SDM) to multiple PDSCHs from the multiple TRPs. Schemes 2a and 2b apply frequency division multiplexing (FDM) to PDSCHs from the multiple TRPs. In scheme 2a, redundancy versions (RVs) for the multiple TRPs are the same. In scheme 2b, the RVs for the multiple TRPs may be the same, or may be different from each other. Schemes 3 and 4 apply time division multiplexing (TDM) to multiple PDSCHs from the multiple TRPs. In scheme 3, the multiple PDSCHs from the multiple TRPs are transmitted in one slot. In scheme 4, the multiple PDSCHs from the multiple TRPs are transmitted in different slots.

According to such a multi-TRP scenario, it is possible to perform more flexible transmission control using a high-quality channel.

However, how to determine whether the UE performs a single panel/TRP operation (receiving operation using a QCL parameter for a single panel/TRP) or the UE performs a multi-panel/TRP operation (receiving operation using a QCL parameter for multiple panels/TRPs) is indefinite. It is conceivable that CORESET pool indices are not configured for configured CORESETs. In this case, how to determine a CORESET pool (TRP/panel) used for reception is indefinite. Unless the UE determines these appropriately, system performance degradation, such as throughput reduction, may occur.

Thus, the inventors of the present invention came up with the idea of a method for determining one or more QCL parameters used for a receiving operation.

Hereinafter, embodiments according to the present disclosure will be described in detail with reference to the drawings. The radio communication methods according to respective embodiments may each be employed individually, or may be employed in combination.

Note that in the present disclosure, a panel, an Uplink (UL) transmission entity, a TRP, a spatial relation, a control resource set (CORESET), a PDSCH, a codeword, a base station, a specific antenna port (e.g., a demodulation reference signal (DMRS) port), an antenna port group (e.g., a DMRS port group), a specific group (e.g., a code division multiplexing (CDM) group, a reference signal group, or a CORESET group), and a CORESET pool may be interchangeably interpreted. A panel Identifier (ID) and a panel may be interchangeably interpreted. A TRP ID and a TRP may be interchangeably interpreted.

In the present disclosure, NCJT, NCJT using multiple TRPs, multiple PDSCHs using NCJT, multiple PDSCHs, a plurality of PDSCHs from multiple TRPs, and the like may be interchangeably interpreted. Note that the multiple PDSCHs may mean a plurality of PDSCHs whose time resources at least partially (e.g., in 1 symbol) overlap with each other, may mean a plurality of PDSCHs whose time resources all (e.g., in all symbols) overlap with each other, may mean a plurality of PDSCHs whose time resources do not all overlap with each other, may mean a plurality of PDSCHs to deliver the same TB or the same CW, or may mean a plurality of PDSCHs to which different UE beams (spatial domain reception filters or QCL parameters) are applied.

In the present disclosure, a default TCI state, default QCL, and a default QCL assumption may be interchangeably interpreted. Hereinafter, this TCI state or QCL (QCL assumption) is mainly denoted as a default TCI state, but the name is not limited to this. Note that the definition of the default TCI state is not limited to this. For example, the default TCI state may be a TCI state assumed in a case where a TCI state/QCL specified by DCI is unavailable for a certain channel/signal (e.g., a PDSCH), or may be a TCI state assumed in a case where the TCI state/QCL is not designated (or configured) for the certain channel/signal.

In the present disclosure, a cell, a CC, a carrier, a BWP, and a band may be interchangeably interpreted.

In the present disclosure, an index, an ID, an indicator, and a resource ID may be interchangeably interpreted.

A TCI state, a TCI state or QCL assumption, a QCL assumption, a QCL parameter, a spatial domain reception filter, a UE spatial domain reception filter, a spatial domain filter, a UE receive beam, a DL receive beam, DL precoding, a DL precoder, a DL-RS, an RS of QCL type D for a TCI state or QCL assumption, and an RS of QCL type A for a TCI state or QCL assumption may be interchangeably interpreted. An RS of QCL type D, a DL-RS associated with QCL type D, a DL-RS having QCL type D, a DL-RS source, an SSB, a CSI-RS, and a TRS may be interchangeably interpreted.

In the present disclosure, the TCI state may be information (e.g., a DL-RS, a QCL type, and a cell in which the DL-RS is transmitted) related to a receive beam (spatial domain reception filter) indicated (configured) for the UE. The QCL assumption may be information (e.g., a DL-RS, a QCL type, and a cell in which the DL-RS is transmitted) related to a receive beam (spatial domain reception filter) assumed by the UE on the basis of transmission or reception of an associated signal (e.g., a PRACH).

In the present disclosure, the latest slot, the most recent slot, the latest search space, and the most recent search space may be interchangeably interpreted.

(Radio Communication Method)

In the present disclosure, a case that the UE performs a single TRP operation, a case that the UE assumes a single TRP operation, a case that the UE performs PDSCH reception from a single TRP, a case that the UE uses (determines) a single TCI state (QCL assumption or QCL parameter), a case that the UE receives a single PDSCH corresponding to a single TCI state, a case that the UE uses (determines) a single spatial relation, a case that the UE assumes specific UL transmission to a single TRP, and a case that the UE performs (assumes) a Rel. 15 operation may be interchangeably interpreted. In the present disclosure, a case that the UE performs a multi-TRP operation, a case that the UE assumes a multi-TRP operation, a case that the UE assumes PDSCH reception from multiple TRPs, a case that the UE uses (determines) a plurality of TCI states (QCL assumptions or QCL parameters), a case that the UE receives a plurality of PDSCHs corresponding to a plurality of TCI states, a case that the UE uses (determines) a plurality of spatial relations, and a case that the UE performs specific UL transmission to multiple TRPs may be interchangeably interpreted.

The UE may receive a plurality of pieces of CORESET information (configuration information, for example, ControlResourceSet). The CORESET information used for configuration of one CORESET may include one CORESET pool index (e.g., CORESETPoolIndex) corresponding to the CORESET, or may not include the CORESET pool index. The CORESET pool index may be associated with a TRP or panel. A size of the CORESET pool index may be 1 bit, or may be 2 bits or more. When the size of the CORESET pool index is 1 bit, a value of the CORESET pool index may be 0 or 1.

The UE may receive configuration information (e.g., PUCCH-Config or controlResourceSetToAddModList) including a CORESET information list (a plurality of CORESETs).

The plurality of pieces of CORESET information may indicate a plurality of CORESETs for one cell (CC), or may indicate a plurality of CORESETs for a plurality of cells (CCs).

When CORESET pool index is not configured for at least one CORESET (when the configuration information does not include CORESET pool index for at least one CORESET), the UE may determine which of the single TRP operation (PDSCH receiving operation using a single QCL parameter) and the multi-TRP operation (PDSCH receiving operation using a plurality of QCL parameters) is used.

Embodiment 1

When CORESET pool indices are not configured for any CORESETs (when the plurality of pieces of CORESET information does not include CORESET pool indices for any CORESETs), a UE may perform (assume) the single TRP operation. When CORESET pool indices are not configured for any CORESETs, the UE may perform (assume) the Rel. 15 operation.

FIG. 3 is a diagram to show an example of CORESET pool indices configured for CORESETs in Embodiment 1. In this example, CORESET #1 (CORESET-ID=1), CORESET #2 (CORESET-ID=2), and CORESET #3 (CORESET-ID=3) are configured for the UE (the UE receives configuration information indicating CORESETs #1 to #3). In this example, the CORESET pool indices are not configured for all of configured CORESETs. In this case, the UE may perform the single TRP operation or Rel. 15 operation.

According to this Embodiment 1, even when CORESET pool indices are not configured for any CORESETs, the UE can operate appropriately.

Embodiment 2

For a case where CORESET pool indices are configured for only a part of CORESETs of a plurality of CORESETs, a UE may operate in accordance with any one of the following Embodiments 2-1 and 2-2.

Embodiment 2-1

A UE operation may be defined for the following cases 1 and 2.
[Case 1]
Case 1 is a case where a plurality of values (different values) of CORESET pool indices are configured for two or more CORESETs and CORESET pool indices are not configured for the remaining one or more CORESETs (case where a plurality of pieces of CORESET information include two or more CORESET pool indices for two or more CORESETs of a plurality of configured CORESETs, and do not include CORESET pool indices for the remaining one or more CORESETs).

In case 1, the UE may perform any one of the following operations 1-1 and 1-2.
[[Operation 1-1]]
In case 1, the UE may perform the multi-TRP operation. In this case, the UE may regard (assume) the CORESET pool indices for the remaining one or more CORESETs as a default value.

FIG. 4 is a diagram to show an example of the CORESET pool indices configured for the CORESETs in case 1 of Embodiment 2-1. In this example, CORESETs #1 to #3 are configured for the UE, CORESET pool index 0 is configured for CORESET #1, CORESET pool index 1 is configured for CORESET #2, and a CORESET pool index is not configured for CORESET #3. In this case, the UE regards the CORESET pool index for CORESET #3 as a default value, and performs the multi-TRP operation.

The default value may be a fixed value defined in specifications. For example, the fixed value may be 0, or may be 1.

The default value used for a target CORESET for which a CORESET pool index is not configured may be a value of a CORESET pool index corresponding to a specific CORESET of CORESETs for which CORESET pool indices are configured. The specific CORESET may not depend on the target CORESET, or may depend on the target CORESET. The specific CORESET may be any one of the following.

CORESET having lowest CORESET-ID or highest CORESET-ID.

CORESET corresponding to default TCI state or default QCL state for PDSCH. The CORESET corresponding to the default TCI state or default QCL state for the PDSCH may be a CORESET having the lowest CORESET-ID in the latest slot in which one or more CORESETs in an active BWP for a serving cell are monitored by the UE, the CORESET being associated with a search space to be monitored.

CORESET having highest CORESET-ID out of CORESETs associated with search space set having shortest monitoring period (based on an RLM-RS selection method).

CORESET depending on time resource. The CORESET depending on the time resource may be the most recent CORESET, or may be a CORESET for the most recent slot.

CORESET corresponding to same TCI state ID (active TCI state ID) as TCI state ID (active TCI state ID) for target CORESET (PDCCH with target CORESET). For example, in FIG. 4, when a TCI state ID for CORESET #1 is 1 and a TCI state ID for CORESET #3 is 1, the UE may regard a value of a CORESET pool index for CORESET #3 as the same as a value of a CORESET pool index for CORESET #1.

CORESET corresponding to TCI state for RS being in relationship of QCL type D with RS in TCI state for target CORESET (PDCCH with target CORESET) (CORESET having TCI state for same QCL source of QCL type D as QCL source of QCL type D in TCI state for target CORESET). A TCI state ID for the specific CORESET may be the same as a TCI state ID for the target CORESET, or may be different from the TCI state ID. For example, in FIG. 4, when a TCI state ID for CORESET #1 is 1, a TCI state ID for CORESET #3 is 3, and an RS of QCL type D with TCI state ID 3 is the same as an RS of QCL type D with TCI state ID 1, the UE may regard a value of a CORESET pool index for CORESET #3 as the same as a value of a CORESET pool index for CORESET #1.

In the present disclosure, the default value, a default CORESET pool index, and a specific CORESET pool index may be interchangeably interpreted.

[[Operation 1-2]]

The UE may not expect case 1. The UE may not expect reception of configuration information (configuration) about case 1.

[Case 2]

Case 2 is a case where one value (same value) of CORESET pool index is configured for one or more CORESETs and CORESET pool indices are not configured for the remaining one or more CORESETs (case where a plurality of pieces of CORESET information include one CORESET pool index for one or more CORESETs of a plurality of configured CORESETs, and do not include CORESET pool indices for the remaining one or more control resource sets).

In case 2, the UE may perform any one of the following operations 2-1 to 2-4.

[[Operation 2-1]]

In case 2, the UE may perform the single TRP operation. In this case, the UE may regard (assume) the CORESET pool indices for the remaining one or more CORESETs as the same as a CORESET pool index configured for another CORESET.

FIG. 5 is a diagram to show an example of the CORESET pool indices configured for the CORESETs in case 2 of Embodiment 2-1. In this example, CORESETs #1 to #3 are configured for the UE, CORESET pool index 0 is configured for CORESET #1, CORESET pool index 0 is configured for CORESET #2, and a CORESET pool index is not configured for CORESET #3. In this case, the UE regards the CORESET pool index for CORESET #3 as 0 being the same as a value of CORESET pool indices for CORESETs #1 and #2, and performs the single TRP operation.

[[Operation 2-2]]

In case 2, the UE may perform the multi-TRP operation. In this case, the UE may regard (assume) the CORESET pool indices for the remaining one or more CORESETs as being different from a CORESET pool index configured for another CORESET.

For example, when a CORESET pool index configured for a part of CORESETs is 0, the UE may regard CORESET pool indices for the remaining CORESETs as being 1. For example, when a CORESET pool index configured for a part of CORESETs is 1, the UE may regard (assume) CORESET pool indices for the remaining CORESETs as being 0.

In a case of FIG. 5, the UE regards the CORESET pool index for CORESET #3 as 1 being different from a value of CORESET pool indices for CORESETs #1 and #2, and performs the multi-TRP operation.

[[Operation 2-3]]

In case 2, the UE may regard (assume) the CORESET pool indices for the remaining one or more CORESETs as a default value. The default value for operation 2-3 may be the same default value as that for operation 2-1 out of candidates for the above-mentioned default value, may be a default value different from that for operation 2-1.

When the default value is the same as a configured CORESET pool index, the UE may perform the single TRP operation. When the default value is different from the configured CORESET pool index, the UE may perform the multi-TRP operation.

[[Operation 2-4]]

The UE may not expect case 2. The UE may not expect reception of configuration information (configuration) about case 2.

According to this Embodiment 2-1, even when CORESET pool indices are configured for only a part of CORESETs of a plurality of CORESETs, the UE can operate appropriately.

Embodiment 2-2

A UE may not expect that CORESET pool indices are configured for only a part of CORESETs of a plurality of CORESETs. The UE may not expect that a plurality of pieces of CORESET information (configuration) in which the CORESET pool indices are configured for only a part of CORESETs of the plurality of CORESETs are received (the plurality of pieces of CORESET information do not include the CORESET pool indices for a part of CORESETs of the plurality of CORESETs).

According to this Embodiment 2-2, CORESET pool indices are not configured for only a part of CORESETs of a plurality of CORESETs, and thus the UE can operate appropriately.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
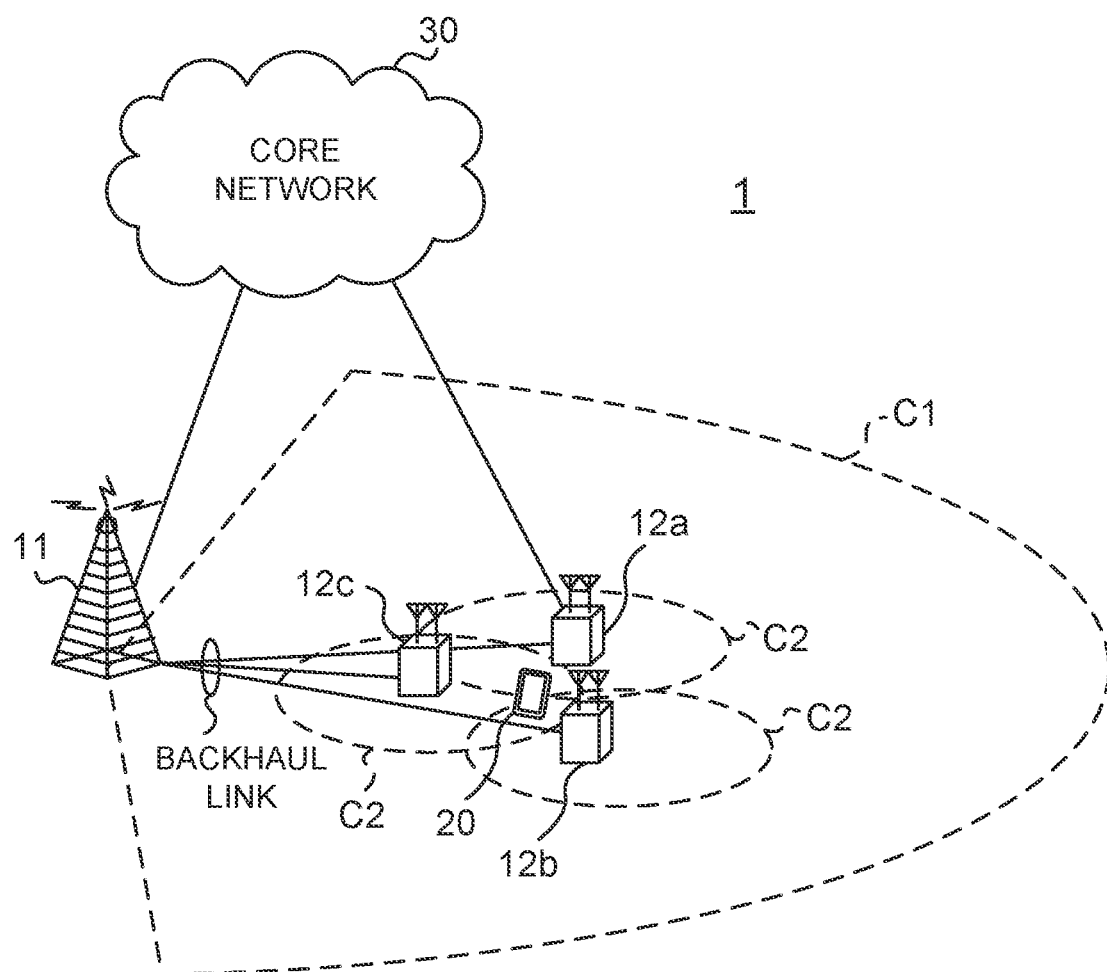
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, when an NR communication is used as a backhaul between the base stations 11 and 12, the base station 11 corresponding to a higher station may be referred to as an "Integrated Access Backhaul (LAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 7:
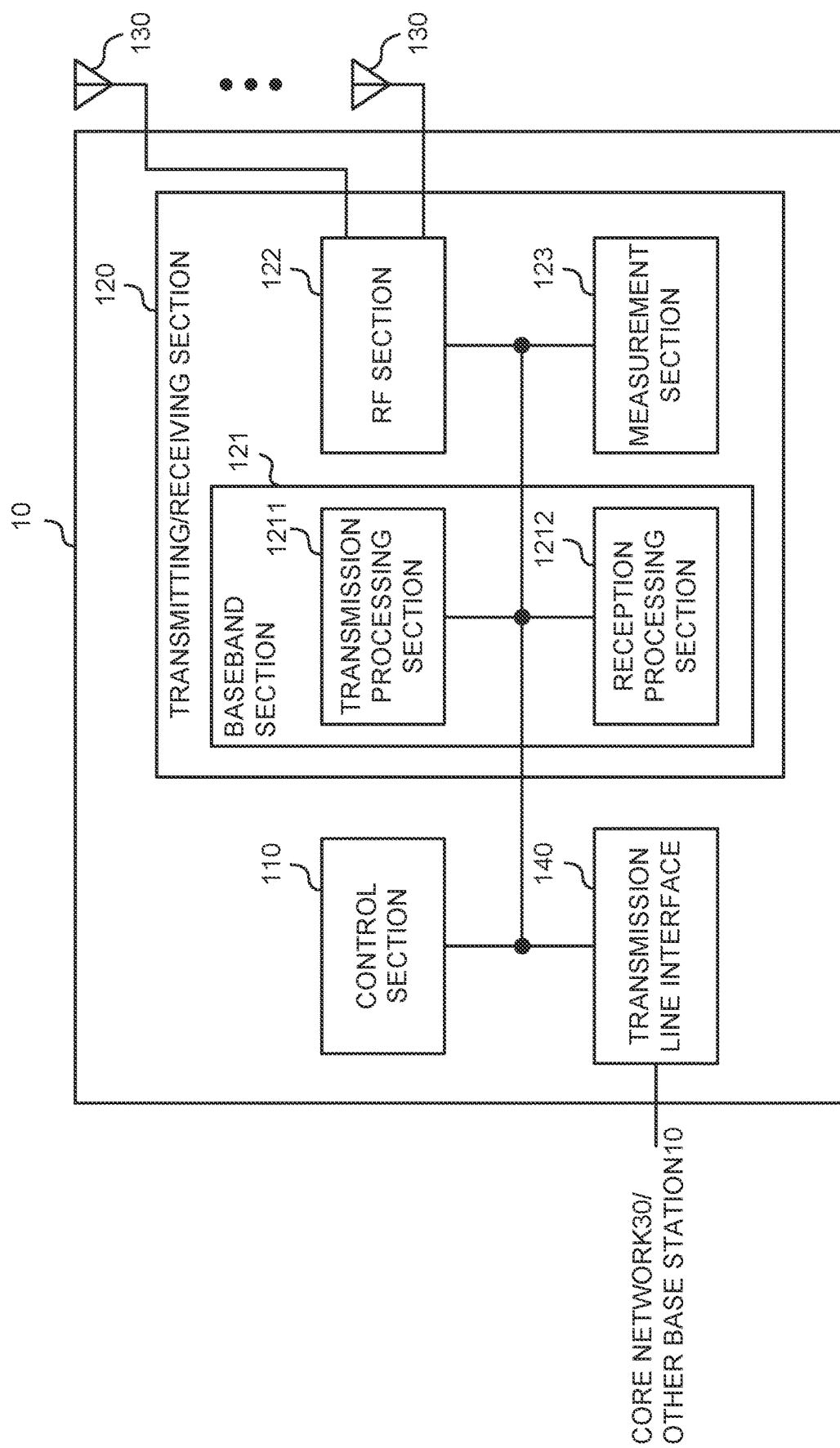
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit either or both of a plurality of downlink shared channels (Physical Downlink Shared Channels (PDSCHs)) (multiple PDSCHs) scheduled on the basis of one piece of downlink control information (single PDCCH).

(User Terminal)

Figure 8:
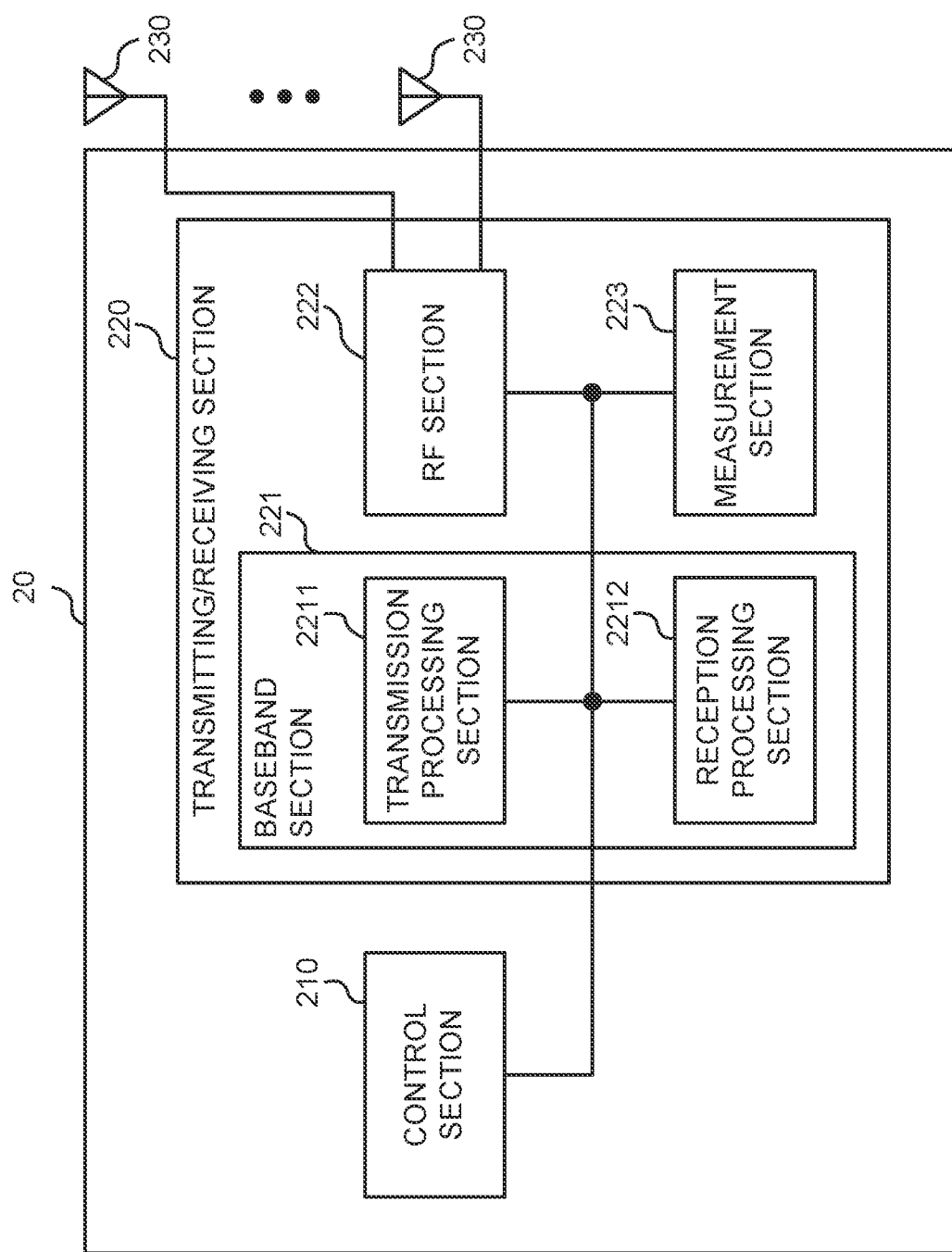
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform when transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a plurality of pieces of configuration information indicating a plurality of control resource sets. When the plurality of pieces of configuration information do not include a control resource set pool index for one or more control resource sets of the plurality of control resource sets, the control section 210 may determine a value of the control resource set pool index for the one or more control resource sets.

When the plurality of pieces of configuration information include one control resource set pool index for at least one control resource set of the plurality of control resource sets, and do not include the control resource set pool index for the one or more control resource sets, the control section 210 may determine the value of the control resource set pool index for the one or more control resource sets.

When the plurality of pieces of configuration information include different control resource set pool indices for two or more control resource sets of the plurality of control resource sets, and do not include the control resource set pool index for the one or more control resource sets, the control section 210 may determine the value of the control resource set pool index for the one or more control resource sets.

The control section 210 may not expect that the plurality of pieces of configuration information do not include a control resource set pool index for some control resource sets of the plurality of control resource sets.

When the plurality of pieces of configuration information do not include control resource set pool indices for any control resource sets, the control section 210 may use one quasi-co-location (QCL) parameter for reception of a physical downlink shared channel.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 9:
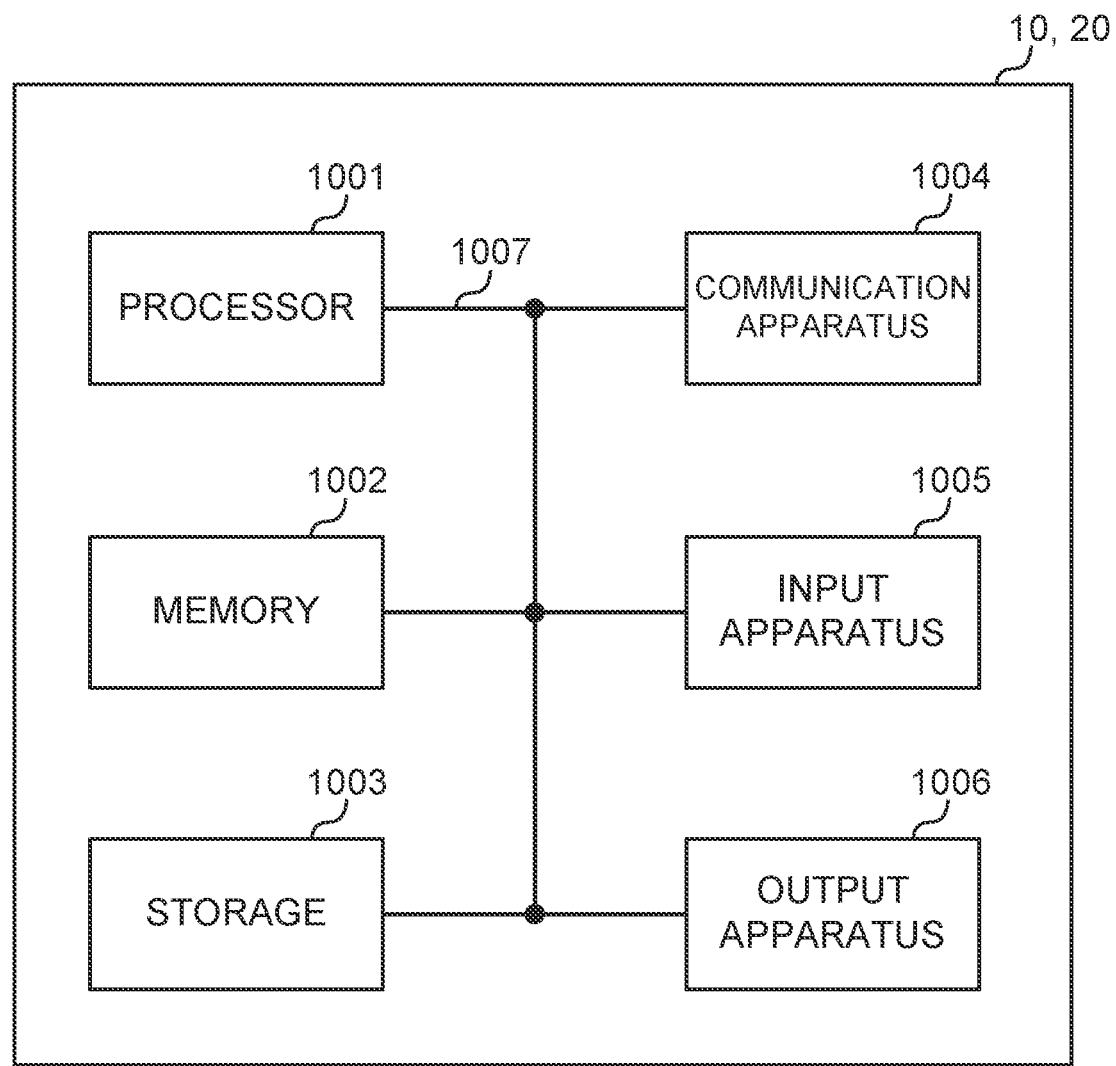
FIG. 9 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives a first configuration of a first control resource set (CORESET), a second configuration of a second CORESET, and a third configuration of a third CORESET; and
   a processor that applies a value 0 to the first CORESET pool index when:
      different values of CORESET pool indices are respectively configured in the second configuration and the third configuration,
      the first configuration does not include a first CORESET pool index for the first CORESET, and
      the second configuration includes a second CORESET pool index of a value 1 for the second CORESET.

2. The terminal according to claim 1, wherein the processor controls reception of a first physical downlink control channel (PDCCH) in the first CORESET and reception of a second PDCCH in the second CORESET, wherein the first PDCCH schedules a first physical downlink shared channel (PDSCH), and the second PDCCH schedules a second PDSCH.

3. A radio communication method for a terminal, comprising:
   receiving a first configuration of a first control resource set (CORESET), a second configuration of a second CORESET, and a third configuration of a third CORESET; and
   applying a value 0 to the first CORESET pool index when:
      different values of CORESET pool indices are respectively configured in the second configuration and the third configuration,
      the first configuration does not include a first CORESET pool index for the first CORESET, and
      the second configuration includes a second CORESET pool index of a value 1 for the second CORESET.

4. A base station comprising:
   a transmitter that transmits a first configuration of a first control resource set (CORESET), a second configuration of a second CORESET, and a third configuration of a third CORESET; and
   a processor that applies a value 0 to the first CORESET pool index when:
      different values of CORESET pool indices are respectively configured in the second configuration and the third configuration,
      the first configuration does not include a first CORESET pool index for the first CORESET, and
      the second configuration includes a second CORESET pool index of a value 1 for the second CORESET.

5. A system comprising a terminal and a base station, wherein the terminal comprises:
   a receiver that receives, from the base station, a first configuration of a first control resource set (CORESET), a second configuration of a second CORESET, and a third configuration of a third CORESET; and
   a processor that applies a value 0 to the first CORESET pool index when:
      different values of CORESET pool indices are respectively configured in the second configuration and the third configuration,
      the first configuration does not include a first CORESET pool index for the first CORESET, and
      the second configuration includes a second CORESET pool index of a value 1 for the second CORESET, and
   the base station transmits, to the terminal, the first configuration, the second configuration, and the third configuration.

* * * * *